Feb. 14, 1950     M. ISAAC ET AL     2,497,305
SNAP FASTENER DEVICE
Filed June 26, 1948
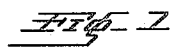
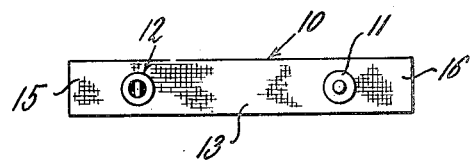
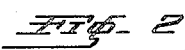
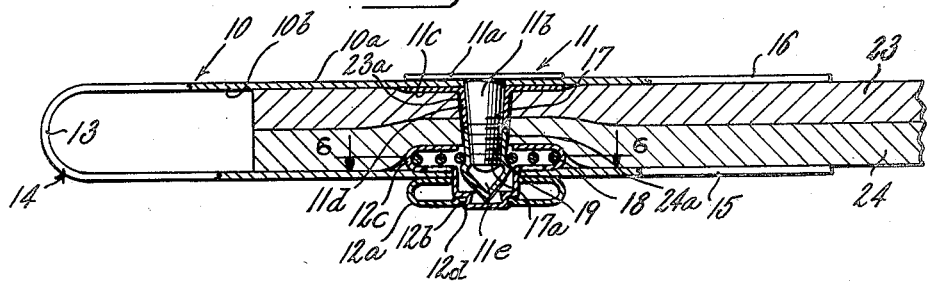
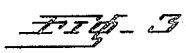
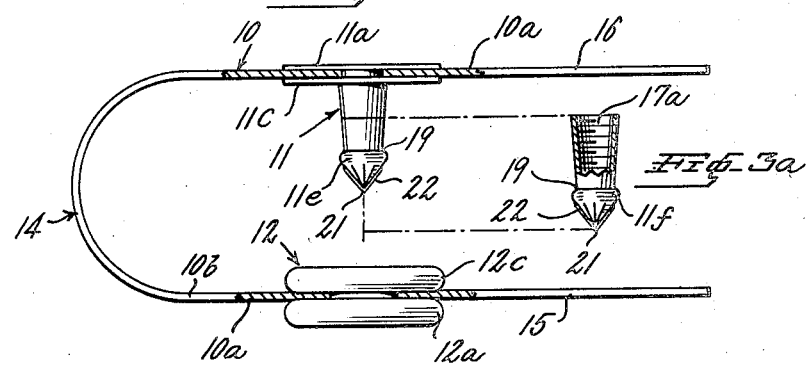
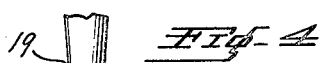
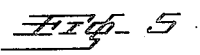
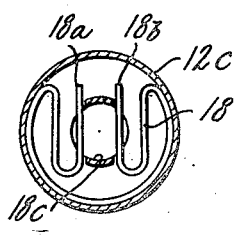
INVENTORS
MIRIAM ISAAC
RICHARD M. RAUNER
BY Patented Feb. 14, 1950

2,497,305

UNITED STATES PATENT OFFICE 2,497,305

SNAP FASTENER DEVICE

Miriam Isaac and Richard M. Rauner, New York, N. Y.

Application June 26, 1948, Serial No. 35,346

3 Claims. (Cl. 24—217)

1

This invention relates to fastener devices and more particularly to snap button devices composed of male and female parts for detachably fixing in place preferably garment accessories, such as dickies, sanitary napkins, panty garters, dress shields, shoulder pads, etc., on margins or edges of jackets, dresses and the like.

It is one of the primary objects of the invention to provide means facilitating ready cutting or piercing of layer or layers of fabric, leather and similar materials by the male part or stud to which the female part of the fastener device is joined.

It is a further object of the invention to provide means affording passage and guidance of the male or stud part of the fastener device through the layer or layers during piercing operation by said male part.

Yet a further object of the invention resides in the provision of means for disposing of the guide element after the stud or male part has been brought into engagement position with the female part of the device.

It is another object of the invention to provide means rendering possible adjustability and interchangeability of the stud or male part to correspond in length to the thickness of the layers or margins of the materials to be attached to each other by said fastener device.

Still another object of the invention is to provide means ensuring construction of relatively flat complementary (male and female) parts of the fastener device so that the same when mounted on a tape or similar carrier nevertheless comes to lie substantially flush with the layers of material to be first pierced or cut and subsequently assembled, whereby any clumsiness, unwieldiness and ungraceful outer appearance of the layers of the material will effectively be avoided.

These and other objects of the invention will be pointed out in the following description and claims and illustrated in the accompanying drawing which discloses, by way of example, the principle of the invention and preferred modes which have been contemplated for applying said principle.

In the drawing:

Fig. 1 a top plan view of a tape with complementary fastener parts secured thereto, made according to the invention.

Fig. 2 is an enlarged and sectional view of the tape with said complementary fastener parts in engaged position and applied to two layers.

Fig. 3 is an enlarged view partly in section of the tape of Fig. 1 with said complementary fastener parts in position before application.

Fig. 3a illustrates, partly in section, the forward or end piece of the male part adapted for interchangeability.

Fig. 4 shows a fragmentary view of the for-

2 ward piece of the male part of the fastener device in modified form.

Fig. 5 shows a further modified form of the forward or end piece of the male part.

Fig. 6 shows a cross-sectional view taken along line 6—6 of Fig. 2.

Referring now more particularly to the drawing there is shown in Fig. 1 a tape 10 on which is mounted metallic snap button means comprising male and female parts 11 and 12 which are spaced from and are complementary to each other. Portion 13 of the tape 10 positioned between the fastener parts 11 and 12 forms in applied or engagement position of the latter a loop 14, whereas the free ends 15, 16 of the tape 10 form handles which may be employed to facilitate disengagement of the fastener parts from each other.

As can be seen in Fig. 2 the male part 11 consists of the plate portion 11a carrying in fixed relation thereto a central, preferably conically shaped pin 11b, which, in this instance, is provided at its forward end with screw threads 17.

As can be seen from Fig. 3 plate portion 11a of male part 11 is positioned substantially flush with the rear face 10a of the tape 10, whereas opposite plate portion 11c comes to lie against the inner or front face 10b of tape 10 when said portions 11a and 11c are brought into tight fit engagement with each other. Plate portion 11c carries the hollow stem portion 11d which, in this particular instance, abuts against the removable stem portion with head or forward piece 11e of the male part 11 which head 11e has inner threads 17a for the engagement with threads 17 of pin 11b.

It is well understood that head or forward piece 11e can thus be replaced by a longer head 11f as indicated in Fig. 3a whereby the effective length of the stud 11 may be varied, as desired. It is further to be noted, that stud 11 may consist of the head proper extending into a single hollow stem which engages with tight fit pin 11b in assembled position of the male part on tape 10. Thus, the stem is made considerably longer than the head of the stud.

The female part 12 consists of hollow outer ring 12a adapted for position against rear face 10a of tape 10. Ring 12a is firmly engaged at 12b by the projecting part 12d of casing 12c which is rivetted in any suitable manner at 12b to ring 12a.

Casing 12c contains spring member 18 whose legs 18a, 18b extend crosswise to opening 18c (Fig. 6) through which stud end 11e extends for the engagement of the constricted neck 19 of the stud with said spring legs in applied position of the fastener device.

As can be visualized from Fig. 3 forward stud piece 11e is provided with sharp cutting edges or burrs 22 which may be of any desired configuration and may be made integral with the material of said stud. As seen in Fig. 3 cutting edges 22 extend radially from the tip 21 of the male or stud part 11 and terminate preferably short of said neck 19.

These cutting edges 22 serve the purpose of piercing any suitable material or materials, either placed in superposed position or successively one after the other, if it is desired to detachably assemble and to hold in position, say, the edge layer 23 of a dickey with an adjacent edge 24 of a jacket.

In Fig. 4 the forward end or head 11g of the stud is conical and without any cutting edges but has a projecting guide and piercing element 20 which is weakened at the tip 21 of said stud for a purpose later referred to.

Fig. 5 illustrates a further modification of the stud structure with a forward end 11h provided with a cutting edge 22a in spiral form and a piercing element 20 projecting from the tip 20 of said stud.

From the above disclosure it will be readily gathered that the cutting means 22 at the forward end piece 11e may be readily employed to cut and pierce through the aforesaid layers 23, 24 thus providing openings 23a, 24a therein which may be used for the passage of the stud 11 whenever the layers of material 23, 24 are to be held in place (on account of the engagement of stud 11 with female part 12) or to be disassociated and disassembled (on account of disengagement of female part 12 from male part 11 by means of handles 15, 16).

If a stud is employed which is provided with the projecting piercing element 20 the latter provides an effective guide for stud 11 when passing through the layers whereby said openings 23a, 24a will remain for renewed or repeated use.

It is well understood that, if piercing element 20 has once fulfilled its purpose, it may be broken off from stud 11 at its weakest point at 21 as soon as the stud is pushed into and comes into engagement with the complementary part 12. Piercing element 20 may also be removed in any other manner, as it is well obvious.

If the thickness of the layers of material to be assembled or joined together necessitates a longer stud the same can be either supplied by replacing stud end piece 11e by another one 11f or a tape carrying a solid stud of corresponding length may be prepared, which has cutting and/or piercing means at its advancing end.

As many possible embodiments may be made of the above invention, and as many changes might be made in the embodiments above set forth, it is to be understood that all matters hereinbefore disclosed are shown in the accompanying drawing, are to be interpreted as illustrative and not in a limiting sense.

Having thus described the invention, what is claimed as new and desired to be secured by Letters Patent, is:

1. A fastener device for detachably joining together layers of pliable material in superposed position comprising snap button means including a male part and a female part engageable with one another, said male part including a conical head terminating in a pointed end, and cutting means extending radially from said pointed end and arranged on said head to thereby facilitate passage of said head of said male part through said layers for subsequent engagement of said male part with said female part.

2. A fastener device for joining together layers of pliable material and for removal from each other; comprising snap button means including a male part and a female part, said male part including a conical head terminating in a pointed end, and piercing means projecting from the surface of said head and arranged to converge toward said pointed end of said head, said male part being guided by said piercing means when the latter passes through said layers for engagement with said female part.

3. A fastener device comprising a male part, a female part, said male part being complementary to said female part and including a stem terminating in a head provided with a conically shaped surface, the length of said stem being relatively longer than that of said head, and piercing means terminating in a pointed end and extending on said conical surface of said head to facilitate perforation of pierceable material and to permit passage of said head through the latter for location of said stem within the perforation and for separable engagement of said head with said female part.

MIRIAM ISAAC.
RICHARD M. RAUNER.

REFERENCES CITED

The following references are of record in the file of this patent:

UNITED STATES PATENTS

| Number | Name | Date |
| --- | --- | --- |
| 446,593 | Freeman | Feb. 17, 1891 |
| 873,128 | Holmes | Dec. 10, 1907 |
| 926,871 | Holmes | July 6, 1909 |
| 1,439,025 | Rose | Dec. 19, 1922 |
| 1,449,080 | Bail | Mar. 20, 1923 |
| 1,773,422 | Caplan | Aug. 19, 1930 |
| 2,111,664 | Gross | Mar. 22, 1938 |